(12) United States Patent
Keating et al.

(10) Patent No.: US 11,191,095 B2
(45) Date of Patent: Nov. 30, 2021

(54) UPLINK NON-ORTHOGONAL MULTIPLE ACCESS FOR NARROWBAND MACHINE TYPE COMMUNICATION

(71) Applicant: Nokia Technologies Oy, Espoo (FI)

(72) Inventors: Ryan Keating, Chicago, IL (US); Rapeepat Ratasuk, Hoffman Estates, IL (US); Nitin Mangalvedhe, Hoffman Estates, IL (US); Jun Tan, Lake Zurich, IL (US); Jie Chen, Schaumburg, IL (US); Tzu-Chung Hsieh, Hoffman Estates, IL (US)

(73) Assignee: Nokia Technologies Oy, Espoo (FI)

( * ) Notice: Subject to any disclaimer, the term of this patent is extended or adjusted under 35 U.S.C. 154(b) by 48 days.

(21) Appl. No.: 16/483,087

(22) PCT Filed: Feb. 1, 2018

(86) PCT No.: PCT/FI2018/050074
§ 371 (c)(1),
(2) Date: Aug. 2, 2019

(87) PCT Pub. No.: WO2018/146377
PCT Pub. Date: Aug. 16, 2018

(65) Prior Publication Data
US 2020/0008221 A1 Jan. 2, 2020

Related U.S. Application Data
(60) Provisional application No. 62/456,226, filed on Feb. 8, 2017.

(51) Int. Cl.
*H04W 72/12* (2009.01)
*H04W 4/70* (2018.01)
(Continued)

(52) U.S. Cl.
CPC ........ *H04W 72/1268* (2013.01); *H04W 4/70* (2018.02); *H04W 72/042* (2013.01);
(Continued)

(58) Field of Classification Search
CPC . H04W 72/1268; H04W 4/70; H04W 72/042; H04W 72/085; H04W 72/0446;
(Continued)

(56) References Cited

U.S. PATENT DOCUMENTS

2014/0036737 A1    2/2014  Ekpenyong et al. ......... 370/280
2014/0348011 A1*  11/2014  Zirwas .................. H04M 7/006
                                                                370/252
(Continued)

FOREIGN PATENT DOCUMENTS

WO    WO-2017/007937 A1    1/2017
WO    WO-2017/015528 A1    1/2017

OTHER PUBLICATIONS

3GPP TSG-RAN WG1 Meeting #75, San Francisco, USA, Nov. 11-15, 2013, RI-135155, "PRACH Coverage Enhancement for MTC UE", Alcatel-Lucent, Alcatel-Lucent Shanghai Bell, 8 pgs.
(Continued)

*Primary Examiner* — Ajit Patel
*Assistant Examiner* — Wilfred Thomas
(74) *Attorney, Agent, or Firm* — Harrington & Smith

(57) ABSTRACT

An uplink non-orthogonal multiple access for narrowband machine type communication used for the deployment of Internet of Things (IoT) interconnected devices where one or more user equipment are configured for uplink transmission with one or more uplink time-frequency regions for enhanced Machine Type Communication Non-Orthogonal Multiple Access. The configuring is based on defining and signaling one or more signal thresholds and one or more of a resource assignment, a starting subframe periodicity, a
(Continued)

CONFIGURING ONE OR MORE USER EQUIPMENT FOR UPLINK TRANSMISSION WITH ONE OR MORE UPLINK TIME-FREQUENCY REGIONS FOR ENHANCED MACHINE TYPE COMMUNICATION, WHEREIN THE CONFIGURING IS BASED ON DEFINING AND SIGNALING ONE OR MORE SIGNAL THRESHOLDS AND ONE OR MORE OF A RESOURCE ASSIGNMENT, A STARTING SUBFRAME PERIODICITY, A STARTING SUBFRAME OFFSET, A TIME DURATION IN EACH PERIOD, A DEMODULATION REFERENCE SIGNAL CYCLIC SHIFT ASSIGNMENT, ORTHOGONAL COVER CODE ASSIGNMENT, AND INTERLEAVER ASSIGNMENT ⟶ 710 starting subframe offset, a time duration in each period, a demodulation reference signal cyclic shift assignment, orthogonal cover code assignment, and interleaver assignment.

18 Claims, 5 Drawing Sheets

(51) Int. Cl.
*H04W 72/04* (2009.01)
*H04W 72/08* (2009.01)
*H04L 5/00* (2006.01)

(52) U.S. Cl.
CPC ......... *H04W 72/085* (2013.01); *H04L 5/0007* (2013.01); *H04W 72/0446* (2013.01); *H04W 72/0453* (2013.01)

(58) Field of Classification Search
CPC .. H04W 72/0453; H04W 4/06; H04L 5/0007; H04L 5/0094; H04L 5/0037
See application file for complete search history.

(56) References Cited

U.S. PATENT DOCUMENTS

| | | | |
|---|---|---|---|
| 2015/0117233 A1* | 4/2015 | Wong | H04L 1/188 370/252 |
| 2015/0215883 A1* | 7/2015 | Zheng | H04W 56/0015 455/426.1 |
| 2015/0245320 A1* | 8/2015 | Chen | H04L 5/0069 370/329 |
| 2016/0262111 A1* | 9/2016 | Boudreau | H04W 76/10 |
| 2016/0309507 A1* | 10/2016 | Park | H04W 4/70 |
| 2016/0329981 A1* | 11/2016 | Chung | H04W 72/042 |
| 2016/0338021 A1* | 11/2016 | Chae | H04W 72/042 |
| 2016/0338062 A1 | 11/2016 | Rico-Alvarino et al. | |
| 2017/0033843 A1* | 2/2017 | Wang | H04W 28/0215 |
| 2017/0070994 A1 | 3/2017 | Rico Alvarino et al. | |
| 2017/0273113 A1* | 9/2017 | Tirronen | H04W 72/0446 |
| 2018/0110002 A1* | 4/2018 | Kim | H04L 1/00 |
| 2018/0176892 A1* | 6/2018 | Kim | H04W 52/386 |
| 2018/0220404 A1* | 8/2018 | Awad | H04W 72/042 |
| 2018/0255585 A1* | 9/2018 | Tirronen | H04W 74/0833 |
| 2018/0302842 A1* | 10/2018 | Sugirtharaj | H04L 5/0048 |
| 2018/0310230 A1* | 10/2018 | Niu | H04W 48/12 |
| 2019/0028978 A1* | 1/2019 | Yasukawa | H04W 52/383 |
| 2019/0037621 A1* | 1/2019 | Feng | H04W 28/0278 |
| 2019/0059057 A1* | 2/2019 | Peng | H04W 52/146 |
| 2020/0008221 A1* | 1/2020 | Keating | H04W 72/1268 |

OTHER PUBLICATIONS

3GPP TSG RAN WG1 Meeting #82bis, Malmo, Sweden, Oct. 5-9, 2015, R1-155923, "UE-specific MPDCCH initialization for Rel-13 low Complexity MTC", NTT DOCOMO, 5 pgs.

"NB-PRACH Coverage Levels", Sony, 3GPP TSG RAN WG1 Meeting #84, R1-160768, Feb. 2016, 3 pgs.

* cited by examiner

CONFIGURING ONE OR MORE USER EQUIPMENT FOR UPLINK TRANSMISSION WITH ONE OR MORE UPLINK TIME-FREQUENCY REGIONS FOR ENHANCED MACHINE TYPE COMMUNICATION, WHEREIN THE CONFIGURING IS BASED ON DEFINING AND SIGNALING ONE OR MORE SIGNAL THRESHOLDS AND ONE OR MORE OF A RESOURCE ASSIGNMENT, A STARTING SUBFRAME PERIODICITY, A STARTING SUBFRAME OFFSET, A TIME DURATION IN EACH PERIOD, A DEMODULATION REFERENCE SIGNAL CYCLIC SHIFT ASSIGNMENT, ORTHOGONAL COVER CODE ASSIGNMENT, AND INTERLEAVER ASSIGNMENT ⎯710

FIG.7A

UPLINK NON-ORTHOGONAL MULTIPLE ACCESS FOR NARROWBAND MACHINE TYPE COMMUNICATION

CROSS REFERENCE TO RELATED APPLICATIONS

This patent application is a U.S. National Stage application of International Patent Application Number PCT/FI2018/050074 filed Feb. 1, 2018, which is hereby incorporated by reference in its entirety, and claims priority to U.S. provisional application 62/456,226 filed Feb. 8, 2017, which is hereby incorporated by reference in its entirety.

TECHNICAL FIELD

This invention relates generally to narrowband machine type communication and, more specifically, relates to uplink non-orthogonal multiple access for narrowband machine type communication used for the deployment of Internet of Things (IoT) interconnected devices.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Certain abbreviations that may be found in the description and/or in the Figures are herewith defined as follows:
3GPP: 3rd generation project partner
CSI: Channel State Information
DM-RS: Demodulation Reference Signal
eMTC: enhanced Machine Type Communication
eNB: enhanced Node-B
IDMA: Interleave Division Multiple Access
IRC: Interference Rejection Combining
LTE: Long term evolution
MME Mobility management entity
MU-MIMO: Multi-User Multi-Input Multi-Output
MUR: Multi-User Receiver
NCE: Network control element
NOMA: Non-Orthogonal Multiple Access
OCC: Orthogonal Cover Code
OFDM Orthogonal
PD-NOMA: Power Domain—Non-Orthogonal Multiple Access
PRACH: Physical Random Access Channel
RSRP: Reference Signal Received Power
Rx: Receiver
SCMA: Sparse Code Multiple Access
SIC: Successive Interference Cancellation
Tx: Transmitter
UE: User equipment
UL: Uplink
VoLTE: Voice over LTE The deployment of the Internet of Things (IoT), consisting of devices of various types interconnected for communication, is expected to continue significant growth in the next few years. Wireless connectivity through wide-area networks will be an important component of the deployment of the IoT. In 2015, an estimated 0.4 billion IoT devices were connected using cellular networks. This number is expected grow to 1.5 billion in 2021, equivalent to a yearly growth rate of 27%. In Rel-13, the 3GPP introduced a new feature to support narrowband machine type communications (MTC) called enhanced machine type communication (eMTC). eMTC provides for low-complexity devices, and supports massive number of devices, with a battery life of 10 years or more, and coverage enhancement of 15 dB. In Rel-14, eMTC enhancements are being standardized including support for positioning, multicast and voice over LTE (VoLTE). Devices with higher data rates will also be introduced.

In Rel-15, further enhancements for eMTC will be considered. One proposed technology to increase spectral efficiency in Rel-15 is non-orthogonal multiple access (NOMA). Traditionally, users are scheduled in cellular networks in an orthogonal setting so that users are multiplexed in the time, frequency, or code domains in order to minimize interference between users. However, with the explosion in the number of users desiring access to the network these multiplexing techniques begin to fall short. NOMA allows users to overload the same resources and then uses multi-user receiver (MUR) techniques in order to decode all the users simultaneously. There have been proposals for how to realize NOMA including power domain non-orthogonal access (PD-NOMA), interleave division multiple access (IDMA), and sparse coded multiple access (SCMA).

Preferably, eMTC should support an autonomous or contention-based mode where the UE is able to transmit uplink data packets without any scheduling by the eNB. In this mode, demodulation reference signal (DM-RS) selection may be done at the UE without any coordination from the eNB. In this case, the UEs will still have a significant chance of choosing either the same cyclic shift or Orthogonal Cover Code (OCC) especially in the high overloading case. In addition to failing to support the autonomous mode, there is the issue that if many UEs (10 or more for example) are being overloaded on the same resources, the existing solutions are not sufficient for allowing that many orthogonal (or quasi orthogonal) DM-RS selections. This is true even when the eNB is allowed to explicitly assign the DM-RS selection to the UEs. Accordingly, in order for NOMA to be supported in eMTC there needs to be a method for assigning a DM-RS to each UE which addresses these limitations.

SOME EXAMPLE EMBODIMENTS

This section is intended to include some example operations and is not intended to be limiting.

In accordance with an aspect of the present invention, one or more user equipment are configured for uplink transmission with one or more uplink time-frequency regions for enhanced machine type communication. The configuring may be based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment. UEs that are configured for uplink transmission may transmit uplink data packets autonomously without any scheduling by the eNB.

In accordance with another aspect of the invention, an apparatus comprises at least one processor; and at least one memory including computer program code, the at least one memory and the computer program code configured to, with the at least one processor, cause the apparatus to perform at least the following: configure one or more user equipment for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

In accordance with another aspect of the invention, a computer program product comprises a computer-readable medium bearing computer program code embodied therein for use with a computer, the computer program code comprising: code for configuring one or more user equipment for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

SUMMARY

This section is intended to include some example embodiments in accordance with the invention and is not intended to be limiting.

In an example aspect of the invention, there is method, comprising: configuring one or more user equipment for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

In accordance with the example aspects of the method as described in the paragraph above, the following is also applicable:

In accordance with the example aspects the configuring comprises semi-statically configuring the one or more user equipment configured for uplink transmission. In accordance with the example aspects as described in the paragraphs above, the signaling is through a higher layer system information broadcast. In accordance with the example aspects as described in the paragraphs above, the user equipment uses the one or more signal threshold values to identify resources for uplink transmission. In accordance with the example aspects as described in the paragraphs above, the resource assignment includes narrowband indexing and resource block assignment. In accordance with the example aspects as described in the paragraphs above, the time duration comprises a number of subframes in each interval period. In accordance with the example aspects as described in the paragraphs above, the one or more signal thresholds are dependent on at least one reference signal received power values. In accordance with the example aspects as described in the paragraphs above, the user equipment uses the one or more reference signal received power values in combination with one or more channel state information reference signals. In accordance with the example aspects as described in the paragraphs above, there is at least one first user equipment in a first range of reference signal received power values is configured to use a first enhanced machine type communication time-frequency region and at least one second user equipment in a second range of reference signal received power values is configured to use a second enhanced machine type communication time-frequency region. In accordance with the example aspects as described in the paragraphs above, the one or more user equipment operate in autonomous mode; and further comprising selecting a demodulation reference signal for each said one or more user equipment dependent on at least one of a reference signal received power measurement and a channel state information reference signal measurement. In accordance with the example aspects as described in the paragraphs above, the one or more uplink time-frequency regions are assigned to one or more non-adjacent coverage regions dependent on relative received power levels. In accordance with the example aspects as described in the paragraphs above, each said one or more coverage regions are grouped dependent on reference signal received power measurements from the one or more user equipment. In accordance with the example aspects as described in the paragraphs above, each group of said one or more coverage regions is assigned different time frequency resources for non-orthogonal multiple access. In accordance with the example aspects as described in the paragraphs above, each user equipment operates in autonomous mode and selects the assigned demodulation reference signal. In accordance with the example aspects as described in the paragraphs above, a base station assigns the demodulation reference signal to said each user equipment. In accordance with the example aspects as described in the paragraphs above, the base station assigns a same demodulation reference signal for two user equipment in different coverage regions.

In accordance with another example aspect of the invention there is an apparatus, comprising at least one processor; and at least one memory including computer program code, the at least one memory and the computer program code configured to, with the at least one processor, cause the apparatus to perform at least: configuring one or more user equipment for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

In accordance with the example aspects of the apparatus as described in the paragraph above, the following is also applicable:

In accordance with the example aspects of the invention the one or more user equipment operate in autonomous mode; and further comprising selecting a demodulation reference signal for each said one or more user equipment dependent on at least one of a reference signal received power measurement and a channel state information reference signal measurement. In accordance with the example aspects of the invention, the one or more uplink time-frequency regions are assigned to one or more non-adjacent coverage regions. In accordance with the example aspects of the invention, each said one or more coverage regions are grouped dependent on reference signal received power measurements from the one or more user equipment.

In accordance with example embodiments of the invention there is a computer program product comprising a computer-readable medium bearing computer program code embodied therein for use with a computer, the computer program code comprising: code for configuring one or more user equipment for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

BRIEF DESCRIPTION OF THE DRAWINGS

In the attached Drawing Figures:

FIG. 7A shows a method in accordance with example embodiments of the invention which may be performed by an apparatus.

DETAILED DESCRIPTION

The exemplary embodiments herein describe techniques for uplink non-orthogonal multiple access for narrowband machine type communication used, for example, for the deployment of Internet of Things (IoT) interconnected devices. Additional description of these techniques is presented after a system into which the exemplary embodiments may be used is described.

Figure 1:
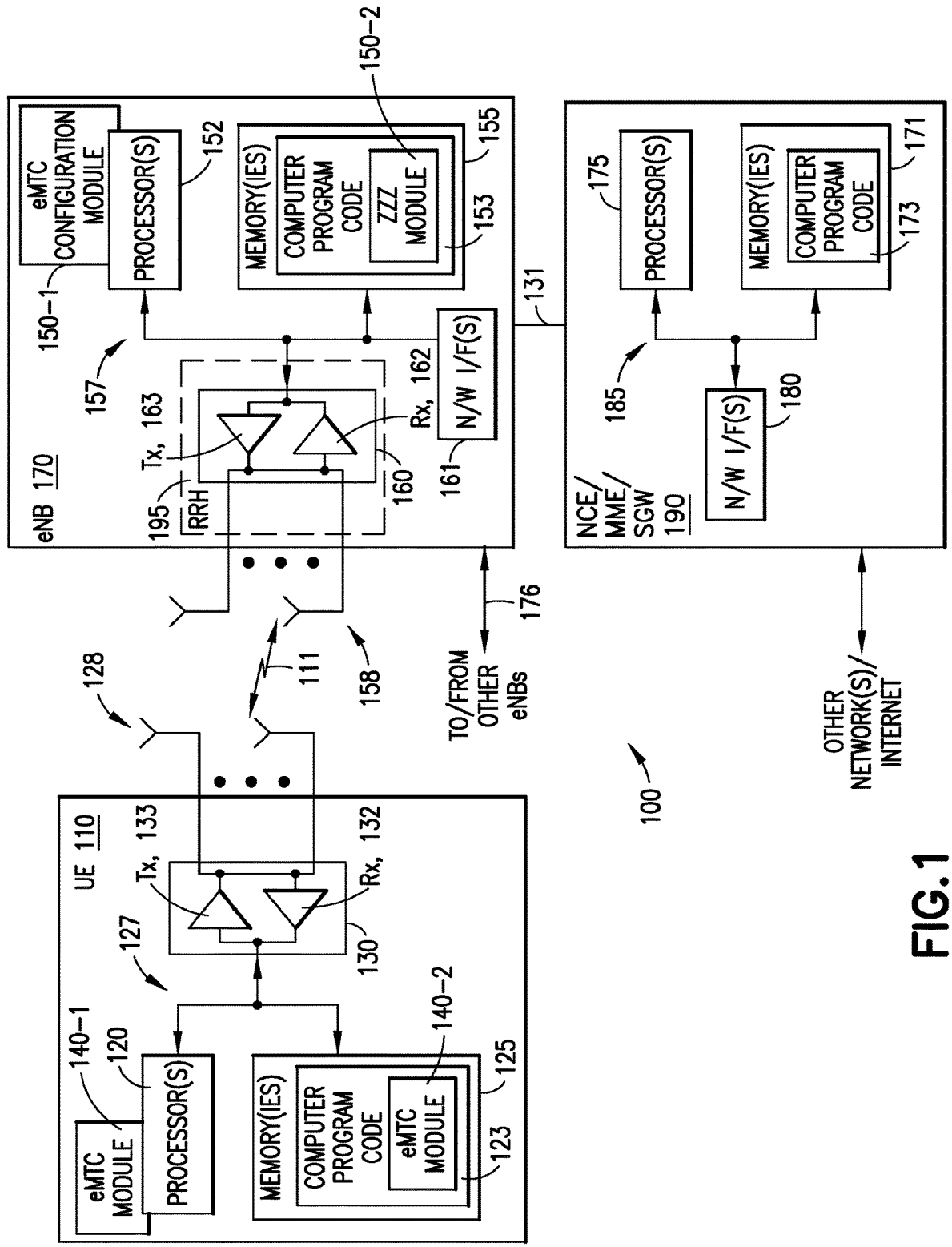
FIG. 1 is a block diagram of one possible and non-limiting system in which the example embodiments of the invention may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes an eMTC module 140, comprising one of or both parts 140-1 and/or 140-2, which may be implemented in a number of ways. The eMTC module 140 may be implemented in hardware as eMTC module 140-1, such as being implemented as part of the one or more processors 120. The eMTC module 140-1 may be implemented also as an integrated circuit or through other hardware such as a programmable gate array. In another example, the eMTC module 140 may be implemented as eMTC module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153.

The eNB 170 includes an eMTC Configuration module 150-1, comprising one of or both parts 150-1 and/or ZZZ module 150-2, which may be implemented in a number of ways. The eMTC Configuration module 150-1 may be implemented in hardware as eMTC Configuration module 150-1, such as being implemented as part of the one or more processors 152. The eMTC Configuration module 150-1 may be implemented also as an integrated circuit or through other hardware such as a programmable gate array. In another example, the eMTC Configuration module 150-1 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
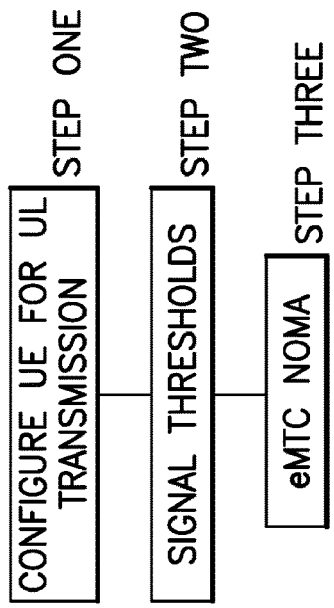
FIG. 2 is a logic flow diagram for enhanced Machine Type Communication Non-Orthogonal Multiple Access, and illustrates the operation of an exemplary method, a result of execution of computer program instructions embodied on a computer readable memory, functions performed by logic implemented in hardware, and/or interconnected means for performing functions in accordance with exemplary embodiments.

FIG. 2 is a logic flow diagram for uplink non-orthogonal multiple access for narrowband machine type communication used for the deployment of Internet of Things (IoT) interconnected devices. In accordance with an embodiment, a base station first defines and signals (e.g., broadcasts) signal thresholds, corresponding time/frequency resources, and various other parameters. A UE receives this information and, further based on signal measurements, is configured for UL transmission in one of the time/frequency resources. One or more user equipment are configured for uplink transmission with one or more uplink time-frequency regions for enhanced Machine Type Communication Non-Orthogonal Multiple Access (Step one). The configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment (Step two). In addition, the configuring can be through system information broadcast, higher-layer such as Radio Resource Control (RRC) signaling, or physical-layer signaling (e.g. using Downlink Control Information). The result is a configuration for the one or more user equipment to perform eMTC NOMA (Step three). That is, the signaling may be through a higher layer system information broadcast, such as radio resource control (RRC) signaling, or physical-layer signaling (e.g. using downlink control Information).

FIG. 1 further illustrates the operation of an exemplary method, a result of execution of computer program instructions embodied on a computer readable memory, functions performed by logic implemented in hardware, and/or interconnected means for performing functions in accordance with exemplary embodiments. For instance, the eMTC module 140-1 and/or 140-2 may include multiple ones of the blocks in FIG. 2, where each included block is an interconnected means for performing the function in the block. The blocks in FIG. 2 are assumed to be performed by the UE 110, e.g., under control of the eMTC module 140-1 and/or 140-2 at least in part and/or uplink non-orthogonal multiple access for narrowband machine type communication used for the deployment of Internet of Things (IoT) interconnected devices performed by a base station such as eNB 170, e.g., under control of the eMTC Configuration module 150-1 at least in part.

In accordance with a non-limiting, exemplary embodiment, one or more user equipment are configured for uplink transmission with one or more uplink time-frequency regions for enhanced Machine Type Communication Non-Orthogonal Multiple Access. The configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

Figure 3:
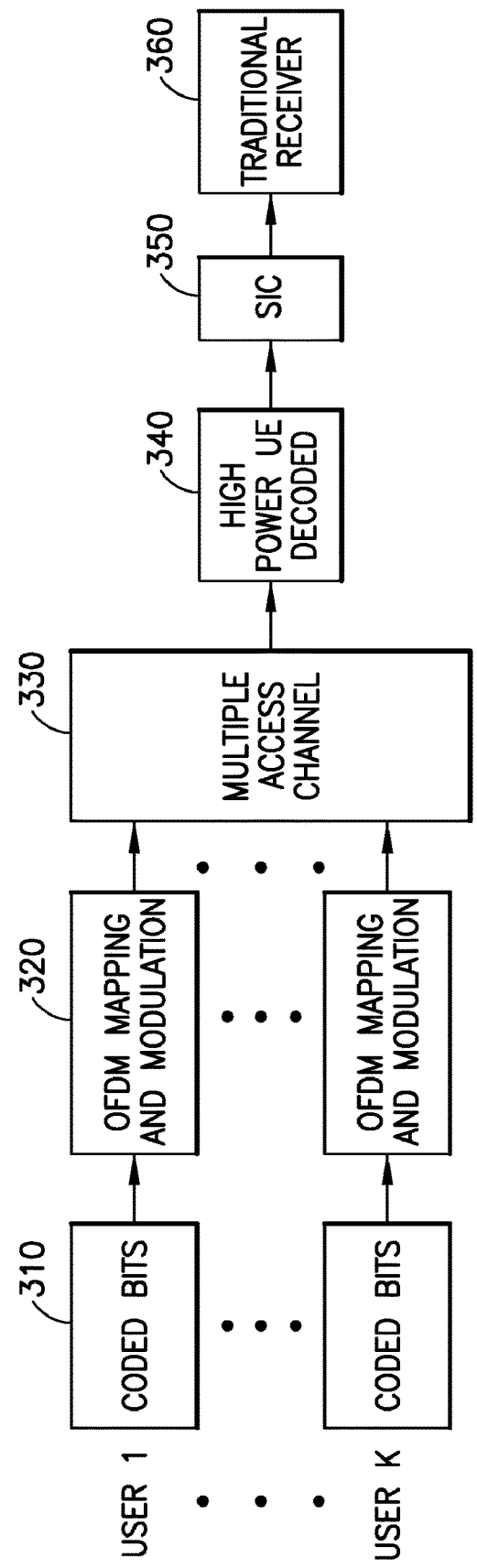
FIG. 3 is a block diagram of a PD-NOMA UL system.

In order to separate and distinguish among users, PD-NOMA takes advantage of users having different received power levels, either through power control or through naturally occurring circumstances in the network. PD-NOMA is used with a successive interference cancellation (SIC) receiver in order to cancel higher power signals, which are decoded first, before decoding the other users. SIC allows signals which share time-frequency resources to be cancel out from one another if there is a sufficient power difference. FIG. 3 shows a block diagram of PD-NOMA as an example of an uplink (UL) NOMA system. A key idea of NOMA is to encourage spectrum sharing, similar to cognitive radio networks. As shown in FIG. 3 there is signaling including coded bits 310 communicated with User 1 thru User k. The signaling including the coded bits 320 from all the users are processed simultaneously using Orthogonal Frequency Division Multiplexing and Modulation 320. The signaling is multiplexed into resource blocks over the Multiple Access Channel 330. Then as shown in FIG. 3 the high powered UEs are decoded, such as for having a higher received power. Then the successive interference cancellation (SIC) module 350 as shown in FIG. 3 can cancel the high power UE decoded signals which were decoded first. Then as shown in FIG. 3 the remaining signals are sent to the Traditional Receiver 360.

Figure 4:
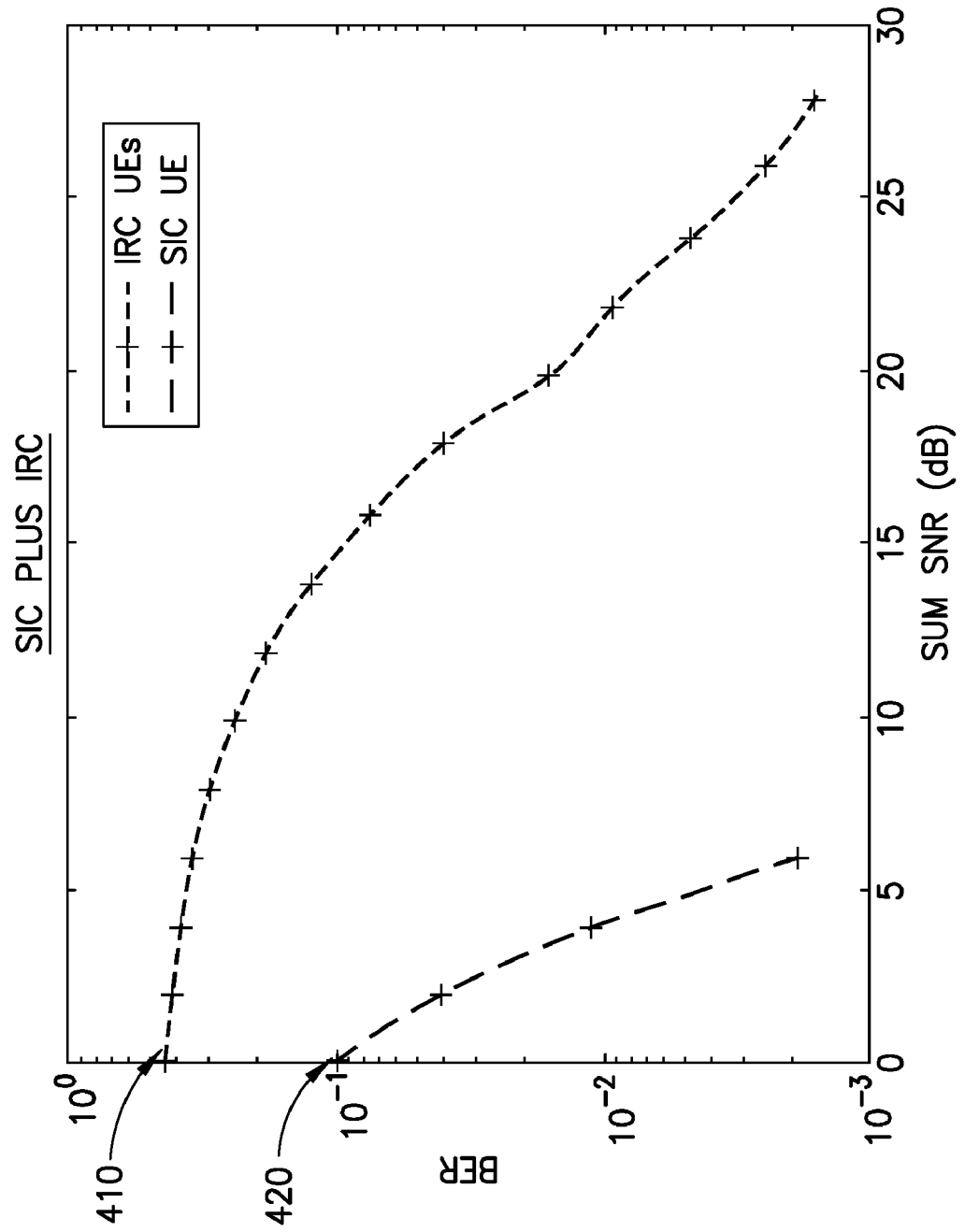
FIG. 4 illustrates simulation results of PD-NOMA.

As shown, for example, in FIG. 4, simulation results show that if there is a sufficient power difference between the received signals then the performance of the lower power UEs is almost unaffected by the presence of the higher power UE. In accordance with the simulation, three UEs were multiplexed onto the same resource blocks with one UE allowed to have a 12 dB higher received power level at the eNB while the other two UEs use MU-MIMO techniques to decode. FIG. 4 shows the results for this scenario showing the Bit Error Rate (BER) 420 of the higher power UE (which is canceled via SIC after decoding) and showing the average BER 410 of the other two UEs which use interference rejection combining.

In accordance with a non-limiting exemplary embodiment, non-orthogonal multiple access (NOMA) is introduced in the uplink as a way to improve capacity so that LTE-based eMTC technology can also achieve the neighborhood relationship (NR) requirements of 1 million devices per $km^2$. An important component of many proposed UL NOMA techniques is the multi-user receiver (MUR) technologies that are employed at the base station (eNB).

Often these MUR techniques rely upon having accurate channel state information (CSI) at the eNB for all users (UEs) which are multiplexed in a non-orthogonal way. Typically, pilot signals are used during the UL signaling in order for the eNB to perform channel estimation. Conventionally, this is achieved with the transmission and reception of the Demodulation Reference Signal (DM-RS). However, a problem arises when multiple UEs are overloaded onto the same resource blocks and therefore their DM-RS are also overlapping. There are some methods which allow for UEs to share resource blocks and still have orthogonal (or quasi-orthogonal) DM-RS. One method is to apply a different cyclic shift to each UE's DM-RS while another is to use a different OCC.

However, these methods are not sufficient to solve the multiple UEs problem in the NOMA setting for multiple reasons. For example, the eMTC should support an autonomous or contention-based uplink transmission mode where the DM-RS selection is done at the UE without any coordination from the eNB. In this case, the UEs will still have significant chance of choosing either the same cyclic shift or OCC especially in the high overloading case. In addition to not supporting the autonomous mode, there is the issue that if many UEs (10 or more for example) are being overloaded on the same resources the existing solutions are not sufficient for allowing that many orthogonal (or quasi orthogonal) DM-RS selections. This is true even when the eNB is allowed to explicitly assign the DM-RS selection to the UEs. In order for NOMA to be supported in eMTC there needs to be a method for assigning a DM-RS to each UE which addresses these limitations.

In eMTC, coverage enhancement of up to 15 dB is supported as a UE can have very high coupling loss (e.g., due to being indoors or in a basement). At the eNB, there is then a large difference in uplink received power levels from eMTC UEs experiencing vastly different coupling losses even when power control is used as many UEs are transmitting at maximum power level. The idea is to exploit this difference in received power levels to group UEs into the same or partially shared time-frequency resources for power domain NOMA. Stated otherwise, the time-frequency resources may be the same or partially overlapping. For instance, UEs in different coverage enhancement levels can be assigned the same or partially shared time-frequency resources in order to exploit the large difference in uplink received power levels at the eNB. In addition, DM-RS selection is also done according to the difference in uplink received power levels.

In accordance with a non-limiting, exemplary embodiment, an eNB semi-statically configures one or more uplink time-frequency resources (region) for autonomous or contention-based eMTC NOMA. The configuration consists of, for example, resource assignment (narrowband index and resource block assignment), starting subframe interval period, starting subframe offset, time duration (number of subframes) in each interval period, and one or more signal thresholds, DM-RS cyclic shift assignment, orthogonal cover code assignment, and interleaver assignment.

UEs that satisfy the signal threshold criteria corresponding to a configured eMTC NOMA time-frequency region use the resources within the region for uplink transmission. The signal thresholds can be one or more pairs of RSRP values (or RSRP ranges). That is, one or more pairs of RSRP values can be provided in the configuration e.g. {P1,P2}, {P3,P4}. Alternatively, beam specific CSI-RS can be used in combination with RSRP thresholds for UEs to determine their resources. UEs with RSRP measurements within the values e.g. P1<P<P2 or P3<P<P4 will select this time frequency resource for eMTC NOMA transmission. Alternately, signal thresholds can be based on the UE coverage enhancement levels or coverage enhancement modes. Alternately, signal thresholds can be based on the UE Physical Random Access Channel (PRACH) configurations or levels.

Figure 5:
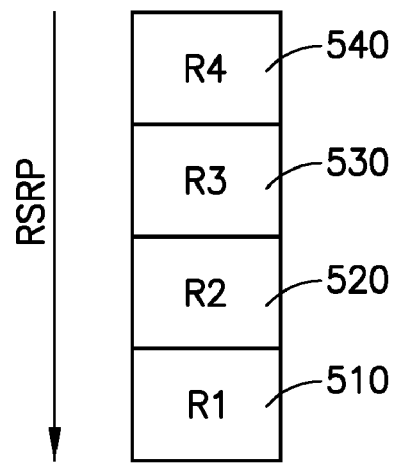
FIG. 5 illustrates UE coverage regions based on RSRP thresholds.

Time-frequency resources in different eMTC NOMA regions can have different pair(s) of RSRP thresholds. Referring to FIG. 5, UEs with RSRP measurements within range R1 510 or range R3 530 are configured to use the first eMTC NOMA region and UEs with RSRP measurements within range R2 520 or range R4 540 are configured to use the second eMTC NOMA region. In an exemplary embodiment, the UEs operate in autonomous mode and select their DM-RS from the available pool independently based on their RSRP measurement and/or channel state information reference signals (CSI-RS) measurement. That is, the DM-RS set is partitioned into groups and different DM-RS groups are associated with different pairs of RSRP thresholds (i.e., different RSRP ranges), and the UE selects the DM-RS based on which RSRP range it belongs in.

If two UEs within a group select the same DM-RS from the same set but are within different coverage regions (e.g., R1 and R3) then a SIC receiver is used at the eNB to recover both signals. If the eNB determines that there are many more UEs associated with one group relative to the other, it can reconfigure the RSRP thresholds to create new ranges and roughly balance the UE distribution between the DM-RS groups. Alternatively, the UEs that operate in autonomous mode may select their DM-RS from the full set. This may be beneficial, for example, if the UE power distribution is significantly unequal or the number of UEs desiring access is small.

In accordance with another non-limiting, exemplary embodiment, coverage regions or levels are used to characterize the UEs based on relative received power levels. Reference signal received power (RSRP) can be used by the UEs to do this autonomously using thresholds, an example is shown in FIG. 5. UE coverage regions can be grouped together which are not adjacent and assign different time-frequency resources to each group of coverage regions for NOMA. Groups may be assigned in a way such that a pair of UEs which are in the same group but different coverage region (e.g., a UE in R1 and another in R3 from FIG. 5) are sufficiently separated in received power. Coverage regions or levels can be designed such that the size of a region in terms of dB of received power is large enough that the spacing between non-adjacent groups allows for a SIC receiver to perform well.

Figure 6:
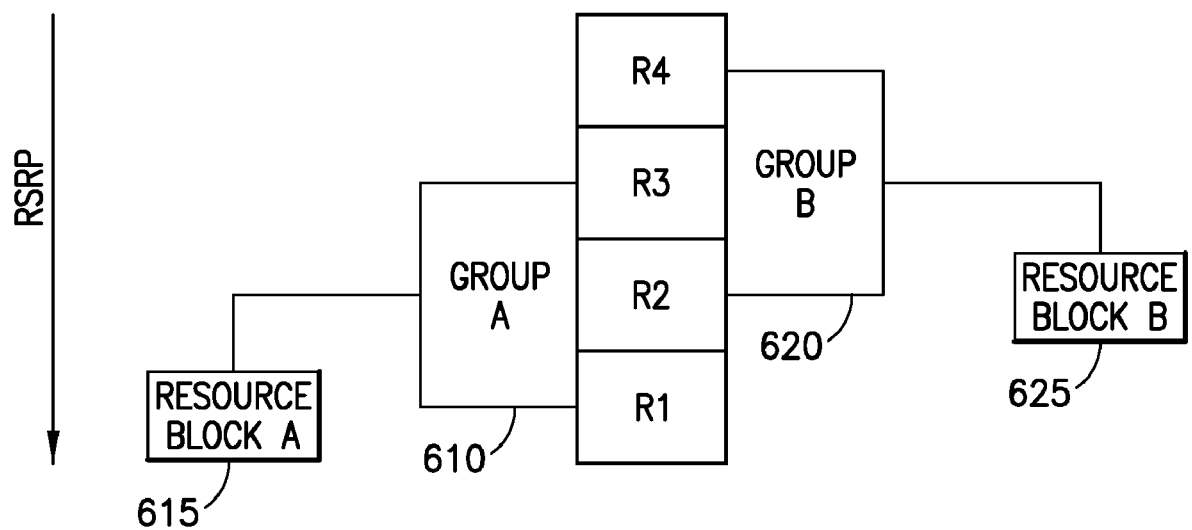
FIG. 6 illustrates an example grouping and resource selection for DN-RS.

The coverage regions that are not adjacent may be grouped together and assigned different resources to each group of coverage regions. FIG. 6 shows an example grouping and resource selection for DN-RS.

In one example as shown in FIG. 6, groups consist of two coverage regions where the minimum distance (in terms of RSRP) between the coverage regions within any group is maximized. In another example, there are just two groups, Group A 610 and Group B 620, which consist of alternating coverage regions. Group A is assigned resource block A 615 and Group B is assigned Resource Block B 625. The DM-RS for each UE can be then selected based on the group they are placed in.

In one example the UEs operate in autonomous uplink transmission mode and select their DM-RS independently based on their group only. In another example, an eNB assigns the choice of DM-RS directly and allows for reuses of same DM-RS if the UEs are within the same group but in different coverage regions. The eNB can utilize SIC to perform channel estimation (and potentially decode) UEs which are in higher power UE coverage regions first before cancelling them and then moving on to perform channel estimation on the UEs in the lower power coverage regions within the same grouping.

In accordance with a non-limiting, exemplary embodiment, one or more user equipment are configured for uplink transmission with one or more uplink time-frequency regions for enhanced Machine Type Communication Non-Orthogonal Multiple Access. The configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

The configuring may comprise semi-statically configuring the one or more user equipment configured for uplink transmission. The resource assignment may include narrowband indexing and resource block assignment. The time duration may comprise a number of subframes in each interval period.

The one or more signal thresholds may be dependent on at least one reference signal received power values and may be used in combination with one or more channel state information reference signals for resource assignment. At least one first user equipment in a first range of reference signal received power values may be configured to use a first enhanced Machine Type Communication Non-Orthogonal Multiple Access time-frequency region and at least one second user equipment in a second range of reference signal received power values is configured to use a second enhanced Machine Type Communication Non-Orthogonal Multiple Access time-frequency region. The one or more user equipment may operate in autonomous mode. A demodulation reference signal can be selected for each said one or more user equipment dependent on at least one of a reference signal received power measurement and a channel state information reference signal measurement.

The one or more uplink time-frequency regions can be grouped into one or more non-adjacent coverage regions dependent on relative received power levels. Each said one or more coverage regions may be grouped dependent on reference signal received power measurements from the one or more user equipment. Each group of said one or more coverage regions can be assigned different time frequency resources for Non-Orthogonal Multiple Access. Each user equipment can operate in autonomous mode and select the assigned demodulation reference signal. A base station can assign the demodulation reference signal to said each user equipment. The base station can assign a same demodulation reference signal for two user equipment in different coverage regions.

In accordance with a non-limiting, exemplary embodiment, means for configuring one or more user equipment for uplink transmission with one or more uplink time-frequency regions for enhanced machine type communication are provided. The configuring may be based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

Without in any way limiting the scope, interpretation, or application of the claims appearing below, a technical effect of one or more of the example embodiments disclosed herein allows for channel estimates to be performed using DM-RS's from different UEs which are multiplexed in a non-orthogonal way on the same resources. Another technical effect of one or more of the example embodiments disclosed herein enables grouping together UEs corresponding to different received power levels, which can be exploited in power-domain NOMA. In the autonomous mode supported for eMTC it greatly decreases the probability that two UEs would collide in their selection of DM-RS and even in the non-autonomous mode it allows for a significantly higher (at least 2×) number of UEs to be scheduled by the eNB using the same amount of orthogonal or quasi-orthogonal DM-RS sequences.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

FIG. 7A illustrates operations which may be performed by a network device such as, but not limited to, the eNB 170 and/or an NCE/MME/SGW 190 as in FIG. 1. As shown in step 710 of FIG. 7A there is configuring one or more user equipment for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

In accordance with the example embodiments as described in the paragraph above, the configuring comprises semi-statically configuring the one or more user equipment configured for uplink transmission.

In accordance with the example embodiments as described in the paragraphs above, the signaling is through a higher layer system information broadcast.

In accordance with the example embodiments as described in the paragraphs above, the user equipment uses the one or more signal threshold values to identify resources for uplink transmission.

In accordance with the example embodiments as described in the paragraphs above, the resource assignment includes narrowband indexing and resource block assignment.

In accordance with the example embodiments as described in the paragraphs above, the time duration comprises a number of subframes in each interval period.

In accordance with the example embodiments as described in the paragraphs above, the one or more signal thresholds are dependent on at least one reference signal received power values.

In accordance with the example embodiments as described in the paragraphs above, the user equipment uses the one or more reference signal received power values in combination with one or more channel state information reference signals.

In accordance with the example embodiments as described in the paragraphs above, at least one first user equipment in a first range of reference signal received power values is configured to use a first enhanced machine type communication time-frequency region and at least one second user equipment in a second range of reference signal received power values is configured to use a second enhanced machine type communication time-frequency region.

In accordance with the example embodiments as described in the paragraphs above, the one or more user equipment operate in autonomous mode; and further comprising selecting a demodulation reference signal for each said one or more user equipment dependent on at least one of a reference signal received power measurement and a channel state information reference signal measurement.

In accordance with the example embodiments as described in the paragraphs above, the one or more uplink time-frequency regions are assigned to one or more non-adjacent coverage regions dependent on relative received power levels.

In accordance with the example embodiments as described in the paragraphs above, each said one or more coverage regions are grouped dependent on reference signal received power measurements from the one or more user equipment.

In accordance with the example embodiments as described in the paragraphs above, each group of said one or more coverage regions is assigned different time frequency resources for non-orthogonal multiple access.

In accordance with the example embodiments as described in the paragraphs above, said each user equipment operates in autonomous mode and selects the assigned demodulation reference signal.

In accordance with the example embodiments as described in the paragraphs above, a base station assigns the demodulation reference signal to said each user equipment.

In accordance with the example embodiments as described in the paragraphs above, the base station assigns a same demodulation reference signal for two user equipment in different coverage regions.

A non-transitory computer-readable medium (Memory(ies) 155 and/or Memory(ies) 171 as in FIG. 1) storing program code (Computer Program Code 153 and/or Computer Program Code 173 as in FIG. 1), the program code executed by at least one processor (processor(s) 152 and/or Processor(s) 175 and/or eMTC Configuration Module 150-1 as in FIG. 1) to perform the operations as at least described in the paragraphs above.

In accordance with the example embodiments as described above, there is means for configuring (Memory(ies) 155 and/or Memory(ies) 171, Computer Program Code 153 and/or Computer Program Code 173, and processor(s) 152 and/or Processor(s) 175 and/or eMTC Configuration Module 150-1 as in FIG. 1) one or more user equipment (UE 110 as in FIG. 1) for uplink transmission with one or more uplink time-frequency regions for enhanced machine type communication, wherein the configuring is based on defining and signaling one or more signal thresholds and one or more of a resource assignment, a starting subframe periodicity, a starting subframe offset, a time duration in each period, a demodulation reference signal cyclic shift assignment, orthogonal cover code assignment, and interleaver assignment.

In accordance with the example embodiments as described above, wherein at least the means for configuring comprises one or more antennas 158, a remote radio head (RRH) 195 and/or N/W I/F(s) 180, Memory(ies) 155 and/or Memory(ies) 171, Computer Program Code 153 and/or Computer Program Code 173, and processor(s) 152 and/or Processor(s) 175 and/or eMTC Configuration Module 150-1 as in FIG. 1.

As used in this application, the term circuit or circuitry refers to any or all of the following:
  (a) hardware-only circuit implementations (such as implementations in only analog and/or digital circuitry) and
  (b) to combinations of circuits and software (and/or firmware), such as (as applicable):
    (i) to a combination of processor(s) or
    (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that requires software or firmware for operation, even if the software or firmware is not physically present.

This definition of circuitry applies to all uses of this term in this application, including in any claims. As a further example, as used in this application, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
    configuring one user equipment of two or more user equipment for uplink transmission with one or more uplink time-frequency regions for enhanced machine type communication, wherein the configuring comprises defining and signaling one or more signal thresholds dependent on a first range and a second range of reference signal received power values satisfied by the one user equipment to identify resources for one or more uplink transmissions and one or more of a resource assignment, a starting subframe periodicity, a starting subframe offset, a time duration in each period, a demodulation reference signal cyclic shift assignment, orthogonal cover code assignment, or interleaver assignment; and
    based on the configuring, receiving one or more uplink transmissions from the one user equipment, wherein at least one first user equipment of the two or more user equipment in the first range of reference signal received power values is configured to use a first enhanced machine type communication time-frequency region and at least one second user equipment of the two or more user equipment in the second range of reference signal received power values is configured to use a second enhanced machine type communication time-frequency region.

2. The method according to claim 1, wherein the configuring comprises semi-statically configuring the user equipment configured for uplink transmission.

3. The method according to claim 1 wherein the signaling is through a higher layer system information broadcast.

4. The method according to claim 1, wherein the resource assignment includes narrowband indexing and resource block assignment.

5. The method according to claim 1, wherein the time duration comprises a number of subframes in each interval period.

6. The method according to claim 1, wherein at least one of the first user equipment or the second user equipment uses the reference signal received power values in combination with one or more channel state information reference signals.

7. The method according to claim 1, wherein the one user equipment operate in autonomous mode; and further comprising selecting a demodulation reference signal for each said one user equipment dependent on measurements of at least one of the reference signal received power or a channel state information reference signal.

8. The method according to claim 7, wherein the one or more uplink time-frequency regions are assigned to one or more non-adjacent coverage regions dependent on relative received power levels.

9. The method according to claim 8, wherein each said one or more coverage regions are grouped dependent on reference signal received power measurements from the one user equipment.

10. The method according to claim 8, wherein each group of said one or more coverage regions is assigned different time frequency resources for non-orthogonal multiple access.

11. The method according to claim 10, wherein each user equipment operates in autonomous mode and selects the assigned demodulation reference signal.

12. The method according to claim 10, wherein a base station assigns the demodulation reference signal to each user equipment.

13. The method according to claim 12, wherein the base station assigns a same demodulation reference signal for two user equipment of the two or more user equipment in different coverage regions.

14. An apparatus, comprising:
at least one processor; and
at least one memory including computer program code,
the at least one memory and the computer program code configured to, with the at least one processor, cause the apparatus to perform at least:
configuring one user equipment of two or more user equipment for uplink transmission with one or more uplink time-frequency regions for enhanced machine type communication, wherein the configuring comprises defining and signaling one or more signal thresholds dependent on a first range and a second range of reference signal received power values satisfied by the one user equipment to identify resources for one or more uplink transmissions and one or more of a resource assignment, a starting subframe periodicity, a starting subframe offset, a time duration in each period, a demodulation reference signal cyclic shift assignment, orthogonal cover code assignment, or interleaver assignment; and
based on the configuring, receiving one or more uplink transmissions from the one user equipment, wherein at least one first user equipment of the two or more user equipment in the first range of reference signal received power values is configured to use a first enhanced machine type communication time-frequency region and at least one second user equipment of the two or more user equipment in the second range of the reference signal received power values is configured to use a second enhanced machine type communication time-frequency region.

15. The apparatus according to claim 14, wherein the one user equipment operates in autonomous mode; and the at least one memory and the computer program code are further configured to, with the at least one processor, cause the apparatus to perform at least:
selecting a demodulation reference signal for each said one user equipment dependent on measurements of at least one of a the reference signal received power or a channel state information reference.

16. The apparatus according to claim 15, wherein the one or more uplink time-frequency regions are assigned to one or more non-adjacent coverage regions.

17. The apparatus according to claim 16, wherein each said one or more coverage regions are grouped dependent on the reference signal received power measurements from the one user equipment.

18. A computer program product comprising a non-transitory computer-readable medium bearing computer program code embodied therein for use with a computer, the computer program code comprising:
code for configuring one user equipment of two or more user equipment for uplink transmission with one or more uplink time-frequency regions for enhanced machine type communication, wherein the configuring comprises defining and signaling one or more signal thresholds dependent on a first range and a second range of reference signal received power values satisfied by the one user equipment to identify resources for one or more uplink transmissions and one or more of a resource assignment, a starting subframe periodicity, a starting subframe offset, a time duration in each period, a demodulation reference signal cyclic shift assignment, orthogonal cover code assignment, or interleaver assignment; and
code for receiving one or more uplink transmissions from the configured one user equipment, wherein at least one first user equipment of the two or more user equipment in the first range of reference signal received power values is configured to use a first enhanced machine type communication time-frequency region and at least one second user equipment of the two or more user equipment in the second range of reference signal received power values is configured to use a second enhanced machine type communication time-frequency region.

* * * * *